United States Patent
Shimada et al.

(10) Patent No.: US 10,809,458 B2
(45) Date of Patent: Oct. 20, 2020

(54) SPLICING STRUCTURE OF OPTICAL FIBERS

(71) Applicant: SUMITOMO ELECTRIC INDUSTRIES, LTD., Osaka-shi, Osaka (JP)

(72) Inventors: Kensaku Shimada, Osaka (JP); Kazuyuki Sohma, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/211,411

(22) Filed: Dec. 6, 2018

(65) Prior Publication Data

US 2019/0179081 A1    Jun. 13, 2019

(30) Foreign Application Priority Data

Dec. 8, 2017    (JP) ................................ 2017-235836

(51) Int. Cl.
*G02B 6/255* (2006.01)
*G02B 6/02* (2006.01)

(52) U.S. Cl.
CPC ....... *G02B 6/2558* (2013.01); *G02B 6/02395* (2013.01); *G02B 6/2551* (2013.01)

(58) Field of Classification Search
None
See application file for complete search history.

(56) References Cited

U.S. PATENT DOCUMENTS

| 8,792,761 B2 * | 7/2014 | Terruzzi ............... C03C 25/106 385/123 |
| 2003/0139487 A1 | 7/2003 | Montgomery et al. |
| 2004/0036188 A1 * | 2/2004 | Arboix ............... G02B 6/2558 264/1.27 |
| 2012/0093470 A1 * | 4/2012 | Terruzzi ............... C03C 25/106 385/123 |

FOREIGN PATENT DOCUMENTS

| EP | 0206545 A1 | 12/1986 |
| EP | 0566801 A2 | 10/1993 |
| JP | H5-245848 | 9/1993 |
| JP | 2003-75677 A | 3/2003 |
| JP | 2004-331431 A | 11/2004 |
| JP | 2010-134038 A | 6/2010 |
| JP | 2017-49400 A | 3/2017 |

* cited by examiner

*Primary Examiner* — Michelle R Connelly
(74) *Attorney, Agent, or Firm* — Faegre Drinker Biddle & Reath LLP

(57) ABSTRACT

A splicing structure of optical fibers in which optical fibers are coupled together, the optical fibers each comprising: a coated fiber portion including a glass fiber and a coating layer coating an outer periphery of the glass fiber; and a bare fiber portion where a certain length of the glass fiber is projected from an end face of the coating layer in an extending direction, wherein the glass fiber end faces of the bare fiber portion are fusion coupled together, and an outer periphery of the bare fiber portion is coated by a recoating layer, the recoating layer is a cured product of an ultraviolet light curable resin composition including a urethane (meth) acrylate oligomer and a mold release agent, and a content of the mold release agent is 0.01 to 1.5% by mass based on a total amount of the ultraviolet light curable resin composition.

5 Claims, 2 Drawing Sheets

SPLICING STRUCTURE OF OPTICAL FIBERS

TECHNICAL FIELD

The present invention relates to a splicing structure of optical fibers. This application claims a priority based on Japanese Patent Application No. 2017-235836, filed on Dec. 8, 2017, the entire content of which is incorporated herein by reference.

BACKGROUND

A method for protecting a fusion coupled portion of optical fibers by recoating the portion with a resin has been known (see, for example, the following Patent Literatures 1 to 4).

Patent Literature 1: Japanese Unexamined Patent Publication No. 2003-75677
Patent Literature 2: Japanese Unexamined Patent Publication No. 2004-331431
Patent Literature 3: Japanese Unexamined Patent Publication No. 2017-49400
Patent Literature 4: Japanese Unexamined Patent Publication No. 2010-134038

SUMMARY

A splicing structure of optical fibers in which optical fibers are coupled together, the optical fibers each comprising: a coated fiber portion including a glass fiber and a coating layer coating an outer periphery of the glass fiber; and a bare fiber portion where a certain length of the glass fiber is projected from an end face of the coating layer in an extending direction, wherein glass fiber end faces of the bare fiber portion are fusion coupled together, and an outer periphery of the bare fiber portion is coated by a recoating layer, the recoating layer is a cured product of an ultraviolet light curable resin composition including a urethane (meth) acrylate oligomer and a mold release agent, and a content of the mold release agent is 0.01 to 1.5% by mass based on a total amount of the ultraviolet light curable resin composition.

DETAILED DESCRIPTION

Figure 1:
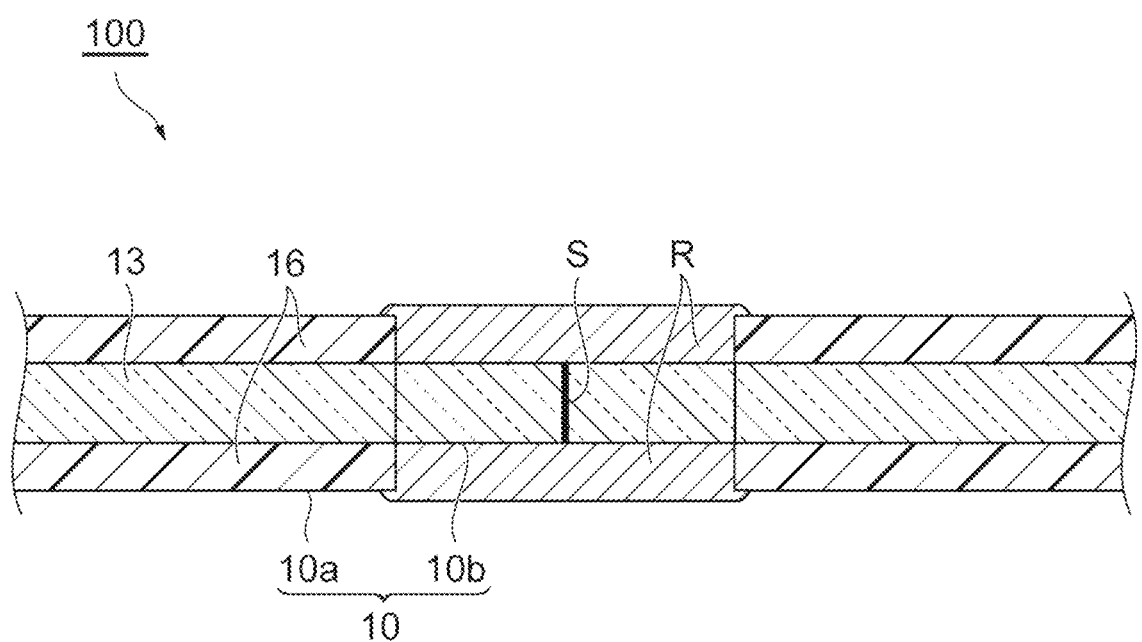
FIG. 1 is a schematic sectional view illustrating one example of a splicing structure of optical fibers according to the present embodiment.

Splicing reliability of the splicing structure obtained by the methods described in the above Patent Literatures is not necessarily sufficient.

Then, an object of the present invention is to provide a splicing structure of optical fibers having excellent splicing reliability at a coupled portion where optical fibers are coupled together.

DESCRIPTION OF EMBODIMENT ACCORDING TO THE PRESENT INVENTION

First, the content of the embodiment according to the present invention will be detailed and described. The splicing structure of optical fibers according to an embodiment of the present invention is as follows.

(1) A splicing structure of optical fibers in which optical fibers are coupled together, the optical fibers each comprising: a coated fiber portion including a glass fiber and a coating layer coating an outer periphery of the glass fiber; and a bare fiber portion where a certain length of the glass fiber is projected from an end face of the coating layer in an extending direction, wherein glass fiber end faces of the bare fiber portion are fusion coupled together, and an outer periphery of the bare fiber portion is coated by a recoating layer, the recoating layer is a cured product of an ultraviolet light curable resin composition including a urethane (meth) acrylate oligomer and a mold release agent, and a content of the mold release agent is 0.01 to 1.5% by mass based on a total amount of the ultraviolet light curable resin composition. The recoating layer is generally formed by placing the bare fiber portion in a prescribed mold (for example, the mold is made of rubber and consists of a first mold and a second mold each having a half-cut shape), injecting a recoating layer forming material (ultraviolet light curable resin composition) in a space formed between the bare fiber portion and the mold, and then curing the material. However, as the material became cured, the recoating layer and the mold used to stick to each other with extremely strong force, so that the recoating layer used to be easily damaged when taken out from the mold. Such damage as a beginning point may cause occuring of a defect during a screening or may cause a breakage of the recoating layer due to ZSA (Zero Stress Aging) occurred in a hot and humid environment. In contrast to this, the present embodiment can prevent the recoating layer from being damaged by adding a mold release agent in a prescribed amount in an ultraviolet light curable resin composition being a recoating layer forming material. Therefore, a splicing structure of optical fibers having excellent splicing reliability can be obtained.

(2) In the above splicing structure of optical fibers, it is preferable that the ultraviolet light curable resin composition further comprise a glass adhesion accelerator.

(3) In the above splicing structure of optical fibers, it is preferable that the mold release agent be at least one selected from the group consisting of a silicone mold release agent and a fluorine mold release agent.

(4) In the above splicing structure of optical fibers, it is preferable that the outer diameter of the recoating layer be the same as the outer diameter of the coating layer or larger than the outer diameter of the coating layer.

(5) In the above splicing structure of optical fibers, it is preferable that a Young's modulus of the recoating layer is 100 MPa or more.

(6) In the above splicing structure of optical fibers, it is preferable that the glass adhesion accelerator comprises a silane coupling agent.

According to the present invention, the splicing structure of optical fibers having excellent splicing reliability at a coupled portion where optical fibers are coupled together is provided.

DETAILED DESCRIPTION OF EMBODIMENT ACCORDING TO THE PRESENT INVENTION

Hereinafter, specific examples of the splicing structure of optical fibers according to an embodiment of the present invention will be described with reference to the drawings. The present invention will not be limited to these examples, but is defined by Claims and intended to include all modifications within the meaning and scope of equivalency of Claims. In the following description, identical reference numbers will be given to identical components in the description of drawings, and the duplication of description will be omitted.

FIG. 1 is a schematic sectional view illustrating one example of a splicing structure of optical fibers according to the present embodiment. As illustrated in FIG. 1, in a splicing structure of optical fibers 100, the optical fibers are fusion coupled together and the outer periphery of a fusion coupled portion is coated by a recoating layer.

An optical fiber 10 includes a coated fiber portion 10a including a glass fiber 13 and a coating layer 16 coating the outer periphery of the glass fiber 13, and a bare fiber portion 10b where a certain length of the glass fiber 13 is projected from an end face of the coating layer in an extending direction. End faces S of the glass fiber 13 of the bare fiber portion 10b are fusion coupled together, and an outer periphery of the bare fiber portion 10b is coated by a recoating layer R. Although a length of the bare fiber portion 10b is not limited to a particular length as long as the glass fibers can be fusion coupled together, the length can be about a few millimeters to tens of millimeters. The optical fiber 10 is not limited to a particular optical fiber and a common optical fiber as illustrated in FIG. 2 can be used.

In terms of providing a sufficient protection for the bare fiber portion 10b of the splicing structure of optical fibers 100, it is preferable that both end faces of the recoating layer R abut on end faces of the coating layer 16 of the coated fiber portion 10a. In terms of providing substantially the uniform outer diameter through an entire splicing structure in a longitudinal direction, a thickness of the recoating layer R can be substantially the same as a thickness of the coating layer 16 of the abutting coated fiber portion 10a. However, in terms of improving the splicing reliability of the splicing structure of optical fibers 100, the recoating layer R may coat the glass fiber of the bare fiber portion 10b and also coat part of the coating layer 16 of the coated fiber portion 10a.

As described above, the outer diameter of the recoating layer R of the bare fiber portion 10b may be substantially almost the same as the outer diameter of the coating layer 16 or larger than the outer diameter of the coating layer 16. Specifically, the outer diameter of the recoating layer R may be larger than the outer diameter of the coating layer 16 by 0 to 200 μm, preferably 10 to 50 μm.

Figure 2:
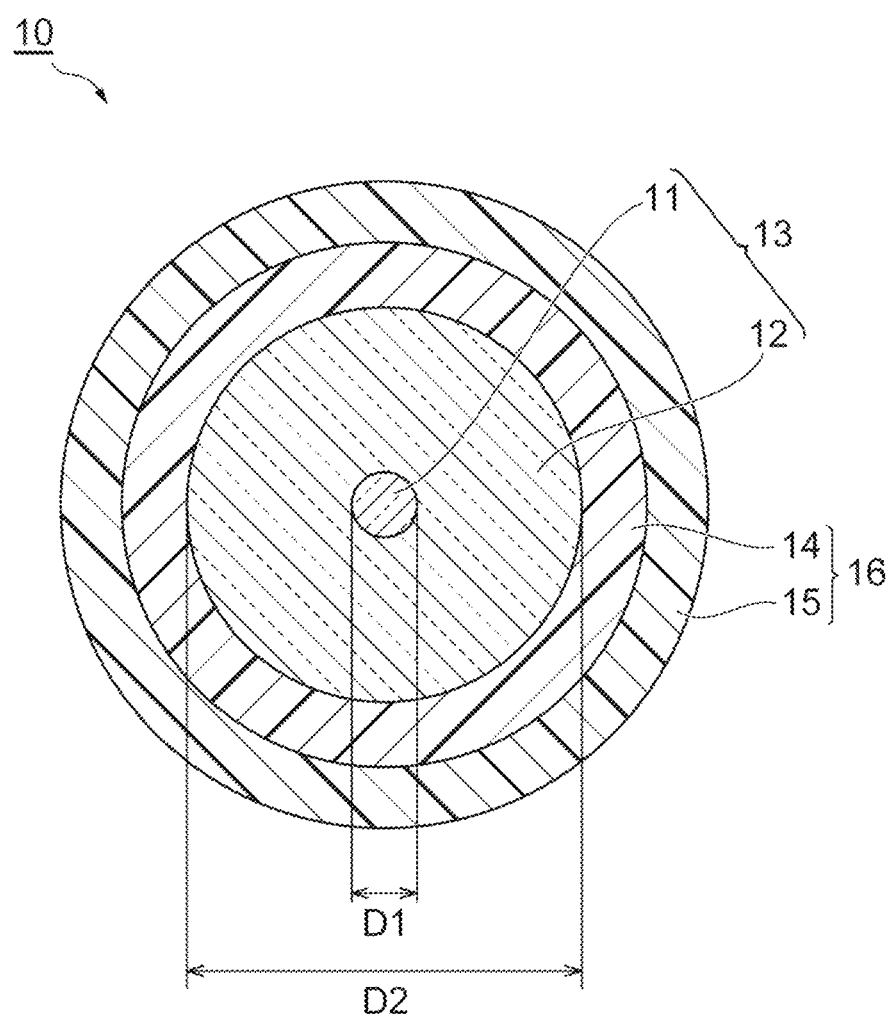
FIG. 2 is a schematic sectional view illustrating one example of the optical fiber.

FIG. 2 is a schematic sectional view illustrating one example of the optical fiber. An optical fiber 10 includes a glass fiber 13 including a core 11 and a cladding 12, and a coating layer 16 including a primary coating layer 14 and a secondary coating layer 15, disposed on the outer periphery of the glass fiber 13. The primary coating layer and the secondary coating layer are each formed of a prescribed resin composition, as described later, and can therefore be referred to as a primary resin layer and a secondary resin layer, respectively.

The cladding 12 surrounds the core 11. The core 11 and the cladding 12 mainly contain glass such as quartz glass; for example, a quartz to which germanium is added can be used as the core 11, and pure quartz or a quartz to which fluorine is added can be used as the cladding 12.

In FIG. 2, for example, the outer diameter (D2) of the glass fiber 13 is about 125 μm. The diameter (D1) of the core 11 constituting the glass fiber 13 is about 7 to 15 μm. The coating layer 16 has at least a two-layered structure including the primary coating layer 14 and the secondary coating layer 15. The total thickness of the coating layer 16 is usually about 60 μm; the thicknesses of the primary coating layer 14 and the secondary coating layer 15 are almost the same and the thickness of each layer is 20 to 40 μm. For example, the thickness of the primary coating layer 14 may be 35 μm and the thickness of the secondary coating layer 15 may be 25 μm. In the case where a large number of the optical fibers are bundled to make a cable, the coating diameter of the optical fiber is preferably thin. In this case, the total thickness of the coating layer 16 is preferably 30 to 40 μm.

The recoating layer is a cured product of an ultraviolet light curable resin composition containing at least a urethane (meth)acrylate oligomer. As the ultraviolet light curable resin composition containing a urethane (meth)acrylate oligomer, an ultraviolet light curable resin composition containing a urethane (meth)acrylate oligomer, a monomer, and a photopolymerization initiator can be used, for example. The primary coating layer and the secondary coating layer can be also formed by curing an ultraviolet light curable resin composition including a urethane (meth)acrylate oligomer, a monomer, and a photopolymerization initiator. In the present embodiment, the recoating layer may be a cured product of a mixture of a first ultraviolet light curable resin composition for forming the primary coating layer and a second ultraviolet light curable resin composition for forming the secondary coating layer.

Examples of the urethane (meth)acrylate oligomer include oligomers obtained by reacting a polyol, a polyisocyanate, and a hydroxyl group-containing (meth)acrylate.

The term (meth)acrylate indicates acrylate or its corresponding methacrylate. The same is true of the term (meth) acrylic acid.

Examples of the polyol include polytetramethylene glycol, polypropylene glycol, and bisphenol A-ethylene oxide addition diol.

Examples of the polyisocyanate include 2,4-tolylene diisocyanate, 2,6-tolylene diisocyanate, isophorone diisocyanate, and dicyclohexylmethane 4,4'-diisocyanate.

Examples of the hydroxyl group-containing (meth)acrylate include 2-hydroxyethyl acrylate, 2-hydroxybutyl acrylate, 1,6-hexanediol monoacrylate, pentaerythritol triacrylate, 2-hydroxypropyl acrylate, and tripropylene glycol diacrylate.

An organic tin compound can be used as a catalyst during synthesis of the urethane (meth)acrylate oligomer. Examples of the organic tin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of availability and catalyst performance, it is preferable that dibutyltin dilaurate or dibutyltin diacetate be used as a catalyst.

A lower alcohol having 5 or less carbon atoms may be used during synthesis of the urethane (meth)acrylate oligomer. Examples of the lower alcohol having 5 or less carbon atoms include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

Hereinafter, preparation of the urethane (meth)acrylate oligomer will be described by reference to a specific example. For example, if polypropylene glycol as a polyol, isophorone diisocyanate as a polyisocyanate, 2-hydroxyethyl acrylate as a hydroxyl group-containing (meth)acrylate, and methanol as an alcohol are used, a urethane (meth)acrylate oligomer containing three reaction products shown below can be obtained.

H-I-(PPG-I)n-H   (1)

H-I-(PPG-I)n-R   (2)

Me-I-(PPG-I)n-R   (3)

Here, H represents the residue of 2-hydroxyethyl acrylate, I represents the residue of isophorone diisocyanate, PPG represents the residue of polypropylene glycol, R represents the residue of alcohol, and n represents an integer of 1 or more.

The reaction product (1) is a reactive oligomer having a (meth)acryloyl group at each of two terminals and therefore, the crosslinking density of the cured product can be increased. The reaction product (2) is a reactive oligomer having a (meth)acryloyl group at its one terminal, and therefore, the reaction product (2) has the effect of reducing the crosslinking density of the cured product, and can reduce the Young's modulus. The reaction product (3) is a non-reactive oligomer having no (meth)acryloyl group and does not contribute to curing with ultraviolet light; therefore, it is preferable that preparation be performed such that the amount of the reaction product (3) is minimized.

When the urethane (meth)acrylate oligomer is synthesized, a silane coupling agent having a functional group reactive with the isocyanate group may be used. Examples of the silane coupling agent having a functional group reactive with the isocyanate group include N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-mercaptopropylmethyldimethoxysilane, and 3-mercaptopropyltrimethoxysilane. If the polyol compound is reacted with the isocyanate compound, the hydroxyl group-containing (meth)acrylate compound and the silane coupling agent are used in combination in the state where an isocyanate group is present on both ends, and are reacted with the isocyanate group, a two-terminal reactive urethane (meth)acrylate oligomer and additionally a one-terminal silane coupling agent addition urethane (meth)acrylate oligomer can be synthesized. As a result, because the oligomer can be reacted with glass, the adhesion between the glass fiber, and the primary layer and the recoating layer can be enhanced.

As a monomer, a monofunctional monomer having one polymerizable group, or a polyfunctional monomer having two or more polymerizable groups can be used. These monomers may be used in the form of a mixture thereof.

Examples of the monofunctional monomer include (meth)acrylate monomers such as methyl (meth)acrylate, ethyl (meth)acrylate, propyl (meth)acrylate, n-butyl (meth)acrylate, s-butyl (meth)acrylate, t-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, phenoxyethyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate (e.g. SR504, manufactured by Sartomer), nonylphenoxypolyethylene glycol (meth)acrylate, and isobornyl (meth)acrylate; carboxyl group-containing monomers such as (meth)acrylic acid, (meth)acrylic acid dimers, carboxyethyl (meth)acrylate, carboxypentyl (meth)acrylate, and ω-carboxy-polycaprolactone (meth)acrylate; heterocycle-containing monomers such as 4-acryloylmorpholine, N-vinylpyrrolidone, N-vinylcaprolactam, N-acryloylpiperidine, N-methacryloylpiperidine, and N-acryloylpyrrolidine; maleimide, N-cyclohexylmaleimide, and N-phenylmaleimide; N-substituted amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-methylol(meth)acrylamide, and N-methylolpropane(meth)acrylamide; aminoalkyl (meth)acrylate monomers such as aminoethyl (meth)acrylate, aminopropyl (meth)acrylate, N,N-dimethylaminoethyl (meth)acrylate, t-butylaminoethyl (meth)acrylate and 3-(3-Pyridinyl) propyl(meth)acrylate. Among the above, it is preferable that the ultraviolet light curable resin composition for forming the secondary coating layer contain a heterocycle-containing monomer in terms of the fact that it shows excellent surface hardness and quick curing properties.

Examples of the polyfunctional monomer include bifunctional monomers such as ethylene glycol di(meth)acrylate, polyethylene glycol di(meth)acrylate, polypropylene glycol di(meth)acrylate, neopentyl glycol di(meth)acrylate, tripropylene glycol di(meth)acrylate, tetraethylene glycol di(meth)acrylate, hydroxy pivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecanediol di(meth)acrylate, 1,20-eicosanediol di(meth)acrylate, isopentyl diol di(meth)acrylate, 3-ethyl-1,8-octanediol di(meth)acrylate; epoxy (meth)acrylates such as di(meth)acrylate of an EO adduct of bisphenol A (e.g., Viscoat #700, manufactured by OSAKA ORGANIC CHEMICAL INDUSTRY LTD.) and di(meth)acrylate of an acrylate adduct of Bisphenol A diglycidyl ether (e.g., Viscoat #540, manufactured by OSAKA ORGANIC CHEMICAL INDUSTRY LTD.); monomers of trifunctions or more such as trimethylolpropane tri(meth)acrylate, trimethyloloctane tri(meth)acrylate, trimethylolpropanepolyethoxy tri(meth)acrylate, trimethylolpropanepolypropoxy tri(meth)acrylate, trimethylolpropanepolyethoxypolypropoxy tri(meth)acrylate, tris[(meth)acryloyloxyethyl] isocyanurate, pentaerythritol tri(meth)acrylate, pentaerythritolpolyethoxy tetra(meth)acrylate, pentaerythritolpolypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate. In view of the excellent surface hardness, it is preferable that the ultraviolet light curable resin composition for forming the secondary coating layer contain an epoxy (meth)acrylate among others.

The photopolymerization initiator can be appropriately selected from known radical photopolymerization initiators; examples of the photopolymerization initiator include 1-hydroxycyclohexylphenyl ketone (Irgacure 184, manufactured by BASF SE), 2,2-dimethoxy-2-phenylacetophenone, 1-(4-isopropylphenyl)-2-hydroxy-2-methylpropan-1-one, 2,4,4-trimethylpentylphosphine oxide, 2,4,4-trimethylbenzoyldiphenylphosphine oxide, 2-methyl-1-[4-(methylthio)phenyl]-2-morpholino-propan-1-one (Irgacure 907, manufactured by BASF SE), 2,4,6-trimethylbenzoyldiphenylphosphine oxide (Irgacure TPO, manufactured by BASF SE), and bis(2,4,6-trimethylbenzoyl)phenylphosphine oxide (Irgacure 819, manufactured by BASF SE).

These photopolymerization initiators may be used in the form of a mixture thereof, and the photopolymerization initiator preferably comprises at least 2,4,6-trimethylbenzoyldiphenylphosphine oxide. 2,4,6-Trimethylbenzoyldiphenylphosphine oxide brings about excellent quick curing properties of resins. It is preferable that the ultraviolet light curable resin composition for forming the secondary coating layer further contain 1-hydroxycyclohexyl phenyl ketone. It can contribute to the increase in the surface hardness.

The ultraviolet light curable resin composition for forming the recoating layer further contains a mold release agent. The mold release agent is not limited to a particular one and examples thereof include a silicone mold release agent and a fluorine mold release agent.

Examples of the silicone mold release agent include a silicone oil (a dimethyl silicone oil) having a dimethylpolysiloxane structure and a modified silicone oil produced by introducing an organic group into the aforementioned silicone oil. Examples of the organic group introduced into the modified silicone oil include an epoxy group, an amino group, a carboxyl group, a carbinol group, a methacryl group, a mercapto group, and a phenol group, and these organic groups may be introduced into a side chain, both terminal ends, one of the terminal ends, or the side chain and both terminal ends of polysiloxane.

Examples of the fluorine mold release agent include fluorosurfactants having a fluoroalkyl group or a fluoroalkenyl group, and fluorine oils such as perfluoropolyether, polychlorotrifluoroethylene, and polytetrafluoroethylene.

The content of the mold release agent is 0.01 to 1.5% by mass based on a total mass of the ultraviolet light curable resin composition. When the content of the mold release agent is 0.01% by mass or more, the recoating layer can be appropriately taken out from the mold. When the content is 1.5% by mass or less, occuring of a crack and a breakage caused by the screening or the ZSA can be prevented. Based on this viewpoint, the content may be 0.01 to 1.2% by mass or may also be 0.01 to 1% by mass.

The ultraviolet light curable resin composition for forming the recoating layer may further contain a glass adhesion accelerator. An example of the glass adhesion accelerator includes a silane coupling agent. The content of the glass adhesion accelerator based on a total mass of the ultraviolet light curable resin composition is preferably 0.01 to 10% by mass and may be 0.01 to 5% by mass, 0.1 to 2% by mass, or 0.1 to 0.5% by mass in terms of the fact that too small content is likely to result in insufficient adhesion with respect to the glass fiber and too much content is likely to make the recoating layer brittle.

The silane coupling agent is not particularly limited as long as it does not obstruct curing of the ultraviolet light curable resin composition, and a variety of silane coupling agents including publicly known and used silane coupling agents can be used. Examples of the silane coupling agent include tetraethoxysilane, 3-mercaptopropyl trimethoxysilane, tetramethyl silicate, tetraethyl silicate, mercaptopropyltrimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropylbenzothiazyl tetrasulfide. By use of the silane coupling agent, the adhesion between the glass fiber and the recoating layer can be controlled, or dynamic fatigue properties can be improved.

The ultraviolet light curable resin composition for forming the recoating layer may further contain a photo acid generator, a leveling agent, an antifoaming agent, and an antioxidant.

As the photo acid generator, an onium salt having a structure represented by $A^+B^-$ may be used. Examples of the photo acid generator include sulfonium salts such as UVACURE 1590 (manufactured by DAICEL-CYTEC Company, Ltd.), and CPI—100P and 110P (manufactured by San-Apro Ltd.); and iodonium salts such as IRGACURE 250 (manufactured by BASF SE), WPI-113 (manufactured by Wako Pure Chemical Industries, Ltd.), and Rp-2074 (manufactured by Rhodia Japan, Ltd.).

As described above, the recoating layer may be a cured product of a mixture of the first ultraviolet light curable resin composition for forming the primary coating layer and the second ultraviolet light curable resin composition for forming the secondary coating layer. In this case, the ultraviolet light curable resin composition for forming the primary coating layer may contain an agent such as a mold release agent and a glass adhesion accelerator.

The Young's modulus of the cured product of the first ultraviolet light curable resin composition is preferably 0.05 to 0.5 MPa at 23° C., more preferably 0.08 to 0.25 MPa. When the Young's modulus is less than 0.05 MPa, cracks (voids) are likely to develop in the primary coating layer by an external force when the primary coating layer is formed. When the Young's modulus is more than 0.5 MPa, an anti-macrobend property is poor.

It is preferable that the Young's modulus of the cured product of the second ultraviolet light curable resin composition be 0.5 to 2.0 GPa at 23° C. When the Young's modulus is less than 0.5 GPa, the anti-macrobend property may be poor when the secondary coating layer is formed, and when the Young's modulus is more than 2.0 GPa, the coating is brittle, and therefore cracks are likely to develop.

When the mixture of the first ultraviolet light curable resin composition and the second ultraviolet light curable resin composition is used as a composition to form a recoating layer, it is preferable that the content of the first ultraviolet light curable resin composition be 20 to 50% by mass based on a total mass of the mixture.

The Young's modulus of the recoating layer is preferably 100 MPa or more, more preferably 150 MPa or more, further preferably 300 MPa or more, in terms of affinity with a resin composing the coating layer. An upper limit of the Young's modulus is not limited to a particular value and can be about 1500 MPa, preferably about 1200 MPa. A glass-transition point of the recoating layer can be about −10° C. to 90° C.

The Young's modulus and the glass-transition point of the cured product of the ultraviolet light curable resin composition can be measured with a nano indenter.

Examples

Hereinafter, the results of evaluation tests using Examples and Comparative Examples according to the present invention will be shown, and the present invention will be described more in detail. The present invention will not be limited to these Examples.

[First Resin Composition: Resin Composition for Primary Coating Layer]

A first resin composition was prepared by using a urethane (meth)acrylate oligomer (average molecular weight of about 3500 (molecular weight distribution of about 3000 to 4000), glass-transition temperature of −30° C.), a prescribed monomer, 3-mercaptopropyl trimethoxysilane as a silane coupling agent, a mold release agent shown in Table 1, and a photo (ultraviolet light)polymerization initiator as a raw material. The Young's modulus of the ultraviolet light cured product of the obtained composition was 0.5 MPa. The silane coupling agent and the mold release agent were used such that their contents (% by mass) in the resin composition for forming a recoating layer were as shown in Table 1.

[Second Resin Composition: Resin Composition for Secondary Coating Layer]

A second resin composition was prepared by using a urethane (meth)acrylate oligomer (average molecular weight of about 2500 (molecular weight distribution of about 2000 to 3000), glass-transition temperature of 80° C.),

[Preparation of a Splicing Structure of Optical Fibers]

The coating layer was removed from the optical fiber with a remover so that the glass fiber was exposed by 5 mm. The exposed glass fibers were washed with acetone, and then the glass fiber end faces were fused together. After that, the fusion coupled portion of the glass fibers was placed in a mold made of rubber, and the resin composition for forming a recoating layer shown in Table 1 was injected into the mold and was cured by ultraviolet light irradiation, thus producing a recoating layer having a thickness of 72.5 μm. The splicing structure of optical fibers of each Example and Comparative Example having the structure illustrated in FIG. 1 was obtained in this manner.

TABLE 1

|  | Resin composition for forming recoating layer | | | | | Recoating layer Young's modulus (MPa) |
| --- | --- | --- | --- | --- | --- | --- |
|  | First resin composition (parts by mass) | Second resin composition (parts by mass) | Third resin composition (parts by mass) | Silane coupling agent (% by mass) | Mold release agent (% by mass) | |
| Example 1 | — | — | 100 | 0.05 (TEOS) | 0.01 (Silicone) | 10 |
| Example 2 | — | — | 100 | 0.05 (TEOS) | 0.01 (Fluorine) | 10 |
| Example 3 | — | — | 100 | 0.05 (TEOS) | 0.5 (Silicone)/0.5 (Fluorine) | 10 |
| Example 4 | — | — | 100 | 0.05 (TEOS) | 1 (Silicone) | 10 |
| Example 5 | 40 | 60 | — | 0.1 (Mercapto) | 0.01 (Fluorine) | 480 |
| Example 6 | 40 | 60 | — | 0.1 (Mercapto) | 0.1 (Silicone) | 480 |
| Example 7 | 40 | 60 | — | 0.1 (Mercapto) | 0.5 (Silicone)/0.5 (Fluorine) | 480 |
| Example 8 | 40 | 60 | — | 0.1 (Mercapto) | 1 (Fluorine) | 480 |
| Comparative Example 1 | — | — | 100 | 0.05 (TEOS) | 2 (Silicone) | 10 |
| Comparative Example 2 | 40 | 60 | — | 0.1 (Mercapto) | 2 (Fluorine) | 480 |
| Comparative Example 3 | — | — | 100 | 0.05 (TEOS) | — | 10 |
| Comparative Example 4 | 40 | 60 | — | 0.1 (Mercapto) | — | 480 |

*TEOS: tetraethoxysilane
Mercapto: 3-mercaptopropyl trimethoxysilane
Silicone: dimethylpolysiloxane
Fluorine: perfluoropolyether a prescribed monomer, and a photo (ultraviolet light)polymerization initiator as a raw material. The Young's modulus of the ultraviolet light cured product of the obtained composition was 800 MPa.

[Third Resin Composition]

A third resin composition was prepared by using a urethane (meth)acrylate oligomer (average molecular weight of about 3400, glass-transition temperature of 40° C.), a prescribed monomer, tetraethoxysilane as a silane coupling agent, and a photo (ultraviolet light)polymerization initiator as a raw material. The Young's modulus of the obtained composition after curing with ultraviolet light was 10 MPa.

[Resin Composition for Forming Recoating Layer]

A resin composition for forming a recoating layer was prepared by using the first resin composition to the third resin composition with the amount shown in Table 1.

[Preparation of Optical Fiber]

An optical fiber having the structure illustrated in FIG. 2 was prepared by using the first resin composition and the second resin composition to form a coating layer (a primary coating layer and a secondary coating layer) on an outer periphery surface of a glass fiber composed of a core and a cladding. A thickness of the primary coating layer was 35 μm and a thickness of the secondary coating layer was 25 μm.

[Various Evaluations]

The obtained splicing structure of optical fibers in each Example and Comparative Example was subjected to the following evaluations. The evaluation results are shown in Table 2. The splicing structure of optical fibers with a positive test result obtained in the screening and the wet heat test was regarded as having excellent splicing reliability.

(1) Screening

An optical fiber including a splicing structure of optical fibers was re-wound while the optical fiber was pulled at a tensile force of 2.2 kg (that is, the optical fiber wound around a bobbin was re-wound around another bobbin). After rewinding, the recoating layer of the splicing structure of optical fibers was observed to check whether there is a crack or not.

(2) Wet Heat Test

An optical fiber including a splicing structure of optical fibers was left to stand for 120 days in a hot and humid (85° C., 85% RH) environment. After the optical fiber was left to stand, a tensile test was performed on the optical fiber in such a manner that the optical fiber was pulled at a tensile force of 2.2 kg and that state was held for 3 seconds to check whether there is a cutting in the splicing structure of optical fibers or not.

TABLE 2

|  | Screening | Wet heat test |
|---|---|---|
| Example 1 | No crack | No cutting |
| Example 2 | No crack | No cutting |
| Example 3 | No crack | No cutting |
| Example 4 | No crack | No cutting |
| Example 5 | No crack | No cutting |
| Example 6 | No crack | No cutting |
| Example 7 | No crack | No cutting |
| Example 8 | No crack | No cutting |
| Comparative Example 1 | No crack | Cutting observed |
| Comparative Example 2 | Crack observed | Cutting observed |
| Comparative Example 3 | Crack observed | Cutting observed |
| Comparative Example 4 | Crack observed | Cutting observed |

REFERENCE SIGNS LIST

10: Optical fiber
10a: Coated fiber portion
10b: Bare fiber portion
11: Core
12: Cladding
13: Glass fiber
14: Primary coating layer
15: Secondary coating layer
16: Coating layer
100: Splicing structure of optical fibers
S: End face
R: Recoating layer

What is claimed is:

1. A splicing structure of optical fibers in which optical fibers are coupled together, the optical fibers each comprising:
   a coated fiber portion including a glass fiber and a coating layer coating an outer periphery of the glass fiber; and
   a bare fiber portion where a certain length of the glass fiber is projected from an end face of the coating layer in an extending direction,
   wherein glass fiber end faces of the bare fiber portion are fusion coupled together, and an outer periphery of the bare fiber portion is coated by a recoating layer,
   the recoating layer is a cured product of an ultraviolet light curable resin composition including a urethane (meth)acrylate oligomer, a mold release agent, and at least one glass adhesion accelerator,
   a content of the mold release agent is 0.01 to 1.5% by mass based on a total amount of the ultraviolet light curable resin composition, and
   a total content of all glass adhesion accelerator accelerators is 0.01 to 2% by mass based on a total amount of the ultraviolet light curable resin composition.

2. The splicing structure of optical fibers according to claim 1, wherein the mold release agent is at least one selected from the group consisting of a silicone mold release agent and a fluorine mold release agent.

3. The splicing structure of optical fibers according to claim 1, wherein an outer diameter of the recoating layer is the same as an outer diameter of the coating layer or larger than the outer diameter of the coating layer.

4. The splicing structure of optical fibers according to claim 1, wherein a Young's modulus of the recoating layer is 100 MPa or more.

5. The splicing structure of optical fibers according to claim 1, wherein the at least one glass adhesion accelerator comprises a silane coupling agent.

* * * * *